United States Patent [19]

Toyoda et al.

[11] Patent Number: 4,963,908
[45] Date of Patent: Oct. 16, 1990

[54] SHUTTER FOR CAMARA

[75] Inventors: Yasuhiro Toyoda; Tsuyoshi Fukuda, both of Kanagawa, Japan

[73] Assignee: Canon Kabushiki Kaisha, Tokyo, Japan

[21] Appl. No.: 247,514

[22] Filed: Sep. 22, 1988

[30] Foreign Application Priority Data

Sep. 25, 1987 [JP] Japan .............................. 62-147356[U]
Sep. 28, 1987 [JP] Japan .............................. 62-148745[U]

[51] Int. Cl.$^5$ ................................................ G03B 9/36
[52] U.S. Cl. ...................................... 354/246; 354/249
[58] Field of Search ............... 354/246, 248, 249, 250, 354/252

[56] References Cited

U.S. PATENT DOCUMENTS

| | | | |
|---|---|---|---|
| 3,733,990 | 5/1973 | Noack et al. | 354/246 |
| 3,847,476 | 11/1974 | Onda et al. | 354/242 |
| 3,886,572 | 5/1975 | Onda et al. | 354/246 |
| 4,054,892 | 10/1977 | Nakagawa et al. | 354/252 |
| 4,493,544 | 1/1985 | Uematsu | 354/246 |

FOREIGN PATENT DOCUMENTS 54-104835 7/1979 Japan .

Primary Examiner—A. A. Mathews
Attorney, Agent, or Firm—Fitzpatrick, Cella, Harper & Scinto

[57] ABSTRACT

A shutter for a camera having leading and trailing blade groups movably interposed in between a plurality of plate-shaped members each of which having a shutter aperture, each of the blade groups including a plurality of divided blades, is provided with a protruding part which is formed along the edge of the shutter aperture in a slanting and outwardly protruding manner. This protruding part prevents the blade groups from being damaged by the impact of collision of them with the edge of the shutter aperture even when they travel in a state of being warped to the outside of a normal blade moving area by an external force.

10 Claims, 14 Drawing Sheets

FIG.2
FIG.3
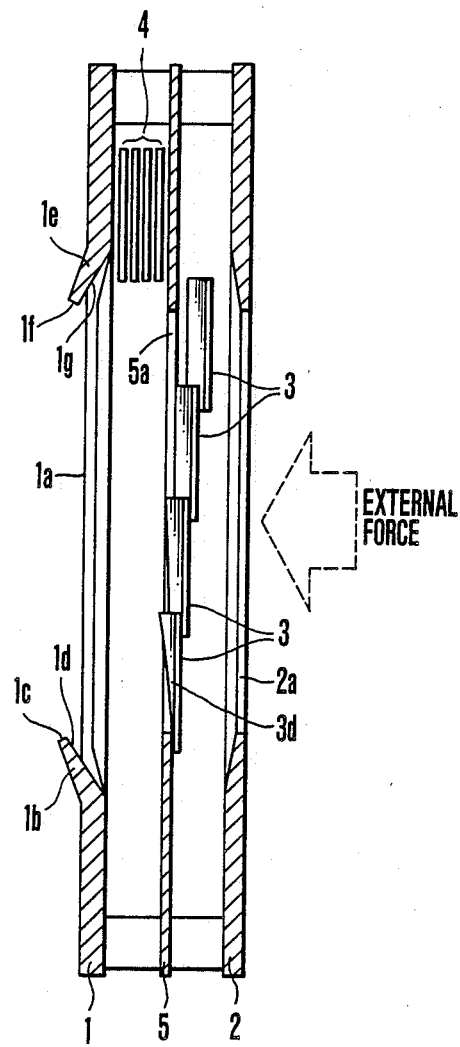
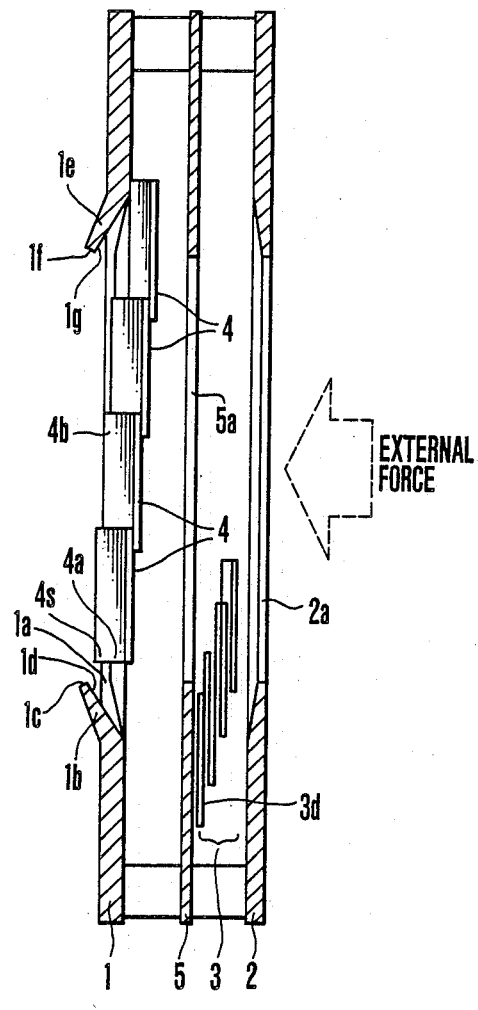

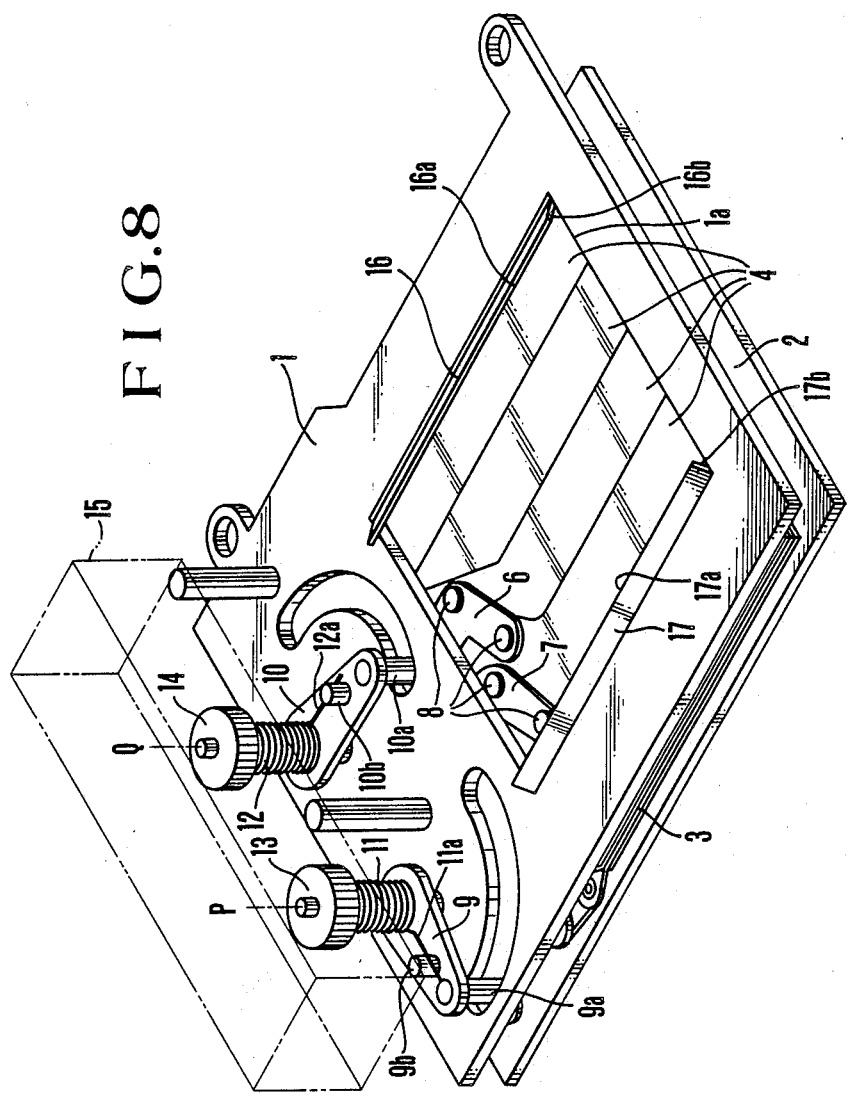

F I G. 25     F I G. 26
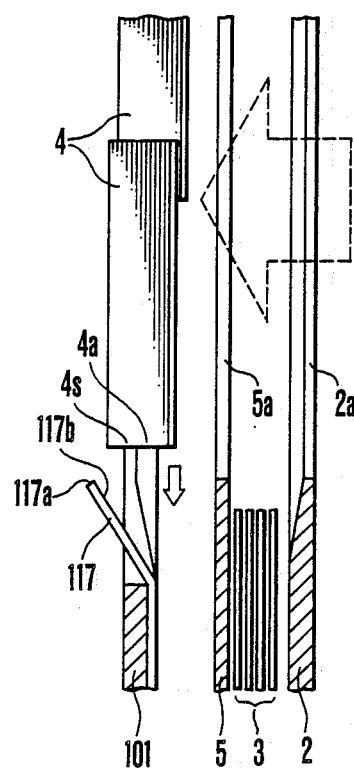
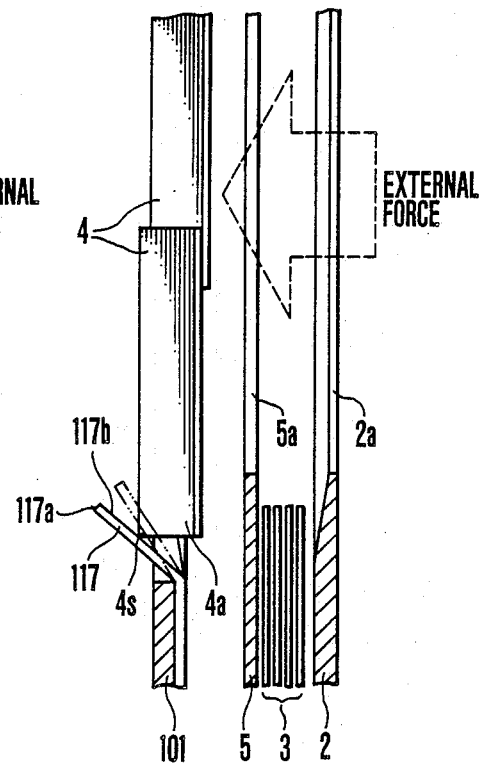

SHUTTER FOR CAMARA

BACKGROUND OF THE INVENTION

1. Field of the Invention

This invention relates to a shutter for a camera having a plurality of divided blades and more particularly to a structural arrangement of the shutter which prevents the shutter blades from being damaged by their collision against the edge of a shutter aperture provided in a shutter base plate, etc. when an external force is exerted on the shutter blades while they are operated.

2. Description of the Related Art

A desire to enlarge the range of photographable objects for a camera has recently resulted in the increase of the maximum and flash-synchronizing speeds of shutters. The increase in speed necessitates an increased driving force on the shutter blades and a decreased weight of shutter blades. Hence, the thickness of the shutter blades has become thinner for reduction in weight.

However, as shown in FIG. 11 of the accompanying drawings which shows an example of the prior art, a travelling space for shutter blades is provided jointly by a shutter base plate 1 (positioned on the front side of the shutter or the mirror box side of the camera), a separating plate 5, a cover plate 2, etc. These plates generally require no special arrangement in connection with the reduction in thickness of shutter blades. Therefore, no change has been made in the form of these plates. For example, the shutter base plate 1 is provided simply with a tapered face lh along the edge of a shutter aperture 1a located in the traveling direction of shutter blades.

Further, referring to FIGS. 11 to 15 which show the prior art example, the conventional shutter arrangement includes a leading blade group 3; a trailing blade group 4; a shutter aperture 1a provided in the shutter base plate 1; a shutter aperture 2a which is provided in the cover plate 2; a shutter aperture 5a provided in the separating plate 5; blade arms 6 and 7; and blade dowels 8.

The structural arrangement of the conventional shutter, however, has the following drawback: The shutter blades having their rigidity lowered by the above stated reduction in thickness would be greatly warped if the shutter is operated while the shutter blades are under an external force which is exerted on them from behind (from the back cover side of the camera) in cases, for example, where the shutter is inadvertently operated with the leader part of a loaded roll of film riding on the shutter blades or with the shutter blades under air pressure while the inside of the back cover of camera is being cleaned by means of a spray. Under such a condition, a slit forming part 4a of the trailing blade group 4 comes to collide with an aperture edge 1c of the shutter base plate 1 which is confronting it and thus would be damaged as shown in FIGS. 12 to 14. More specifically, in the case of a vertical-travel blade type shutter having shutter blades arranged to travel downward from above, the slit forming part 4a of the trailing blade group 4 comes to collide with the aperture edge 1c of the shutter base plate 1 when the shutter blades are traveling, or another part of the trailing blade group 4, such as a part 4b as shown in FIG. 15, comes to collide with another aperture edge of the shutter base plate 1 when the shutter blades are being set for a travel preparing position to cause the shutter blades to be thus damaged there. In the case that the shutter blades are arranged to travel upward from below, a slit forming part of the leading blade group 3 comes to collide with an aperture edge of the shutter base plate 1 when the shutter blades are being set for a travel preparing position or another part of the leading blade group 3 similar to the above stated part 4b comes to collide with an aperture edge of the shutter base plate 1 to damage the shutter when the blades are on their travel.

SUMMARY OF THE INVENTION

One aspect of this invention is the provision of a camera shutter wherein the shutter aperture edge part of a shutter base plate or that of a cover plate is arranged to solely protrude outward in such a way as to prevent shutter blades from being damaged.

Another aspect of the invention is the provision of a camera shutter wherein the shutter aperture edge part of a shutter base plate or that of a cover plate is provided with an elastic member which absorbs the impact of contact with shutter blades to prevent the shutter blades from being damaged.

The above and other aspects and features of the invention will become apparent from the following detailed description of embodiments thereof taken in connection with the accompanying drawings.

BRIEF DESCRIPTION OF THE DRAWINGS

FIG. 2 is a longitudinal section of the first embodiment taken across the middle of a shutter aperture part showing the first embodiment as in a state of having an external force exerted thereon from behind the shutter blades while they are in a travel preparing position.

FIG. 3 is another longitudinal sectional view of the first embodiment taken across the middle of a shutter aperture part showing it as in a state of having an external force exerted from behind the shutter blades while they are in the process of being set in position.

FIG. 8 is an oblique view showing in outline a whole shutter arranged as a second embodiment of the invention.

FIG. 25 is an enlarged sectional view taken across the middle of the shutter aperture part of the fourth embodiment, showing shutter blades as in a traveling state while being warped by an external force which is exerted from behind the shutter blades.

FIG. 26 is an enlarged partial sectional view taken across the middle of the shutter aperture part of the fourth embodiment, showing shutter blades as in a state of having completed their travel while being warped by an external force exerted from behind them.

DETAILED DESCRIPTION OF THE PREFERRED EMBODIMENTS

Figure 1:
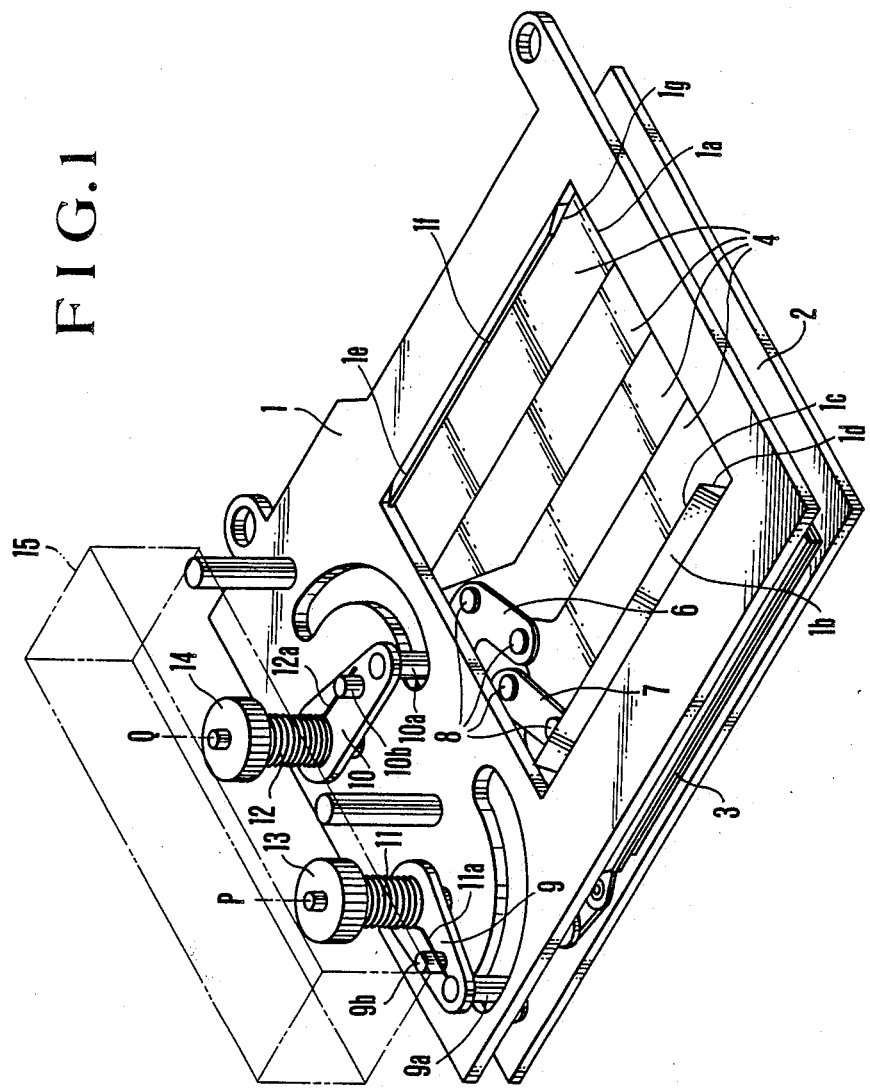
FIG. 1 is an oblique vie showing in outline a whole shutter which is arranged as a first embodiment of this invention.
Figure 5:
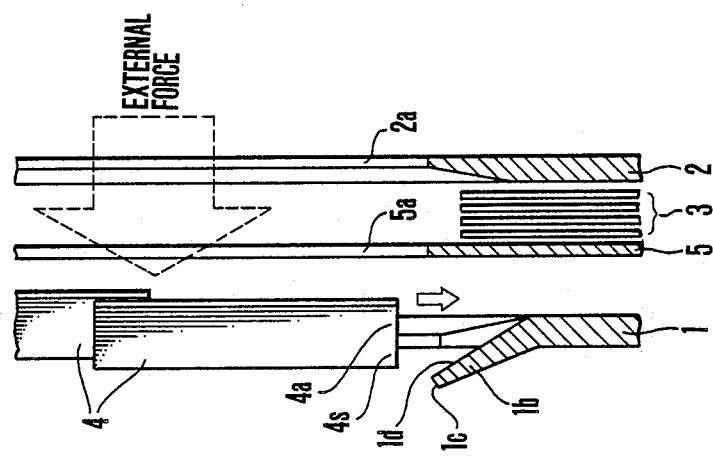
FIG. 5 is an enlarged partial sectional view taken across the middle of the shutter aperture part showing it as in the same state as in FIG. 4.
Figure 4:
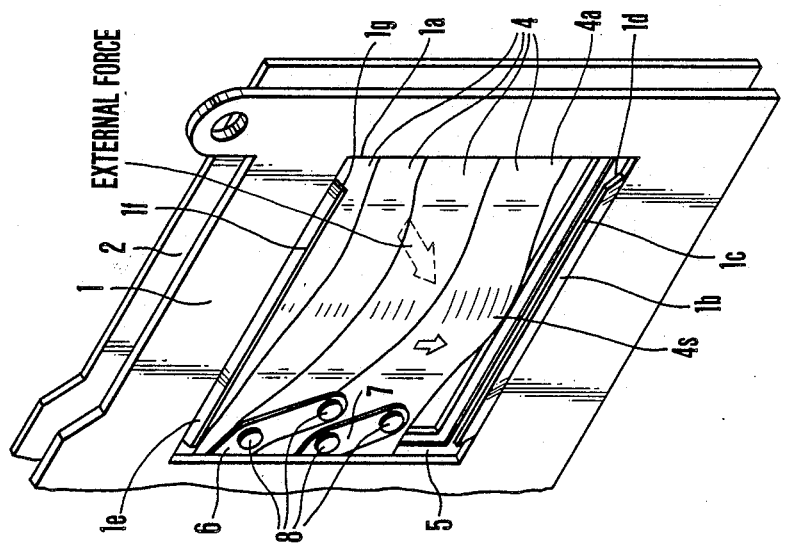
FIG. 4 is a partial oblique view of the first embodiment showing the shutter blades as in a state of being warped by an external force while they are traveling.
Figure 7:
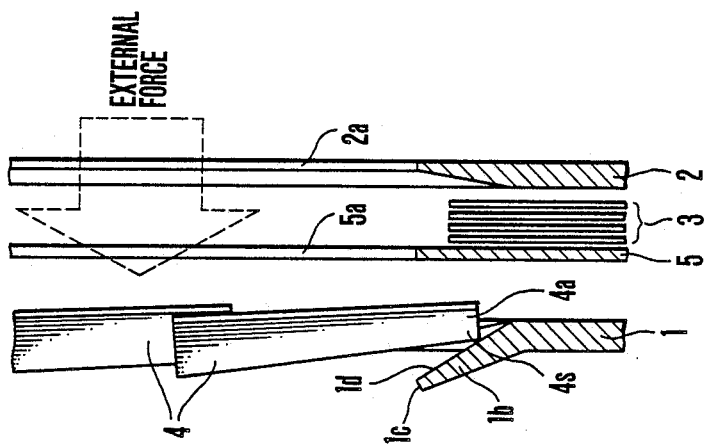
FIG. 7 is an enlarged partial sectional view taken across the middle of the shutter aperture part showing it is in the same state as in FIG. 6.
Figure 6:
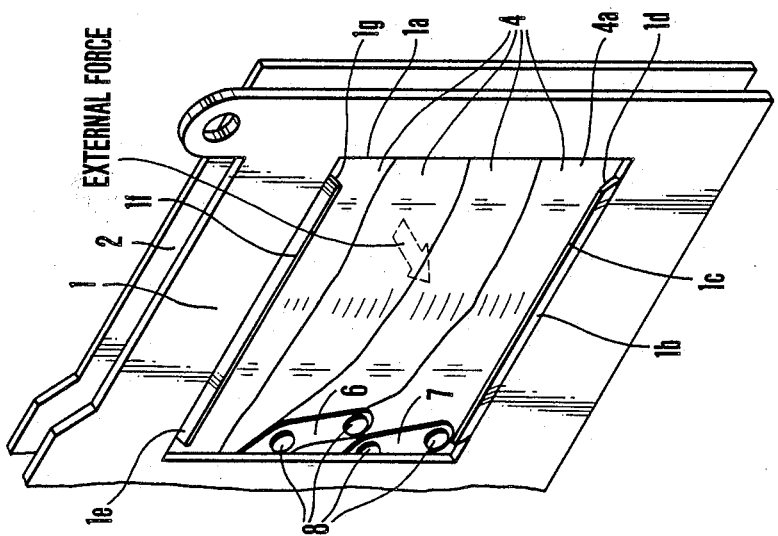
FIG. 6 is a partial oblique view of the first embodiment showing the shutter blades as in a state of having completed their travel while being warped by an external force exerted from behind.

A first embodiment of this invention is arranged as shown in FIGS. 1 to 7, wherein: FIG. 1 is an oblique view showing in outline a whole shutter arranged as the first embodiment. FIGS. 2 and 3 are longitudinal sectional views taken across the middle of a shutter aperture part both showing shutter blades as under an external pressure exerted from behind them, FIG. 2 showing them as in a travel preparing state and FIG. 3 showing them as in a state of being set. FIG. 4 is an oblique view showing the shutter blades as in a traveling state while being warped by an external force exerted from behind them. FIG. 5 is an enlarged partial section view taken across the middle of the shutter aperture part showing the shutter as in the same state as the state shown in FIG. 4. FIG. 6 is an oblique view showing the shutter blades as in a state of having completed their travel while being warped by the external force exerted from behind them. FIG. 7 is an enlarged partial sectional view also taken across the middle of the shutter aperture part showing the shutter as in the same state as the state shown in FIG. 6.

Referring to these drawings, a shutter base plate 1 has a shutter aperture 1a formed in the middle of the base plate 1. The base plate 1 is provided with shutter aperture bent edge parts 1b and 1e. The bent edge parts 1b and 1e represent an essential feature of this embodiment. They are arranged to have end parts 1c and 1f bent and extended toward the front of the shutter (on the side of the lens and the mirror box of the camera) to an extent of not causing any adverse effect on a film exposure and on the action of a movable mirror system, which is not shown. The shutter aperture 1a is further provided with smooth slanting faces 1d and 1g. Further, the above stated bent edge parts 1b and 1e are formed on the edge parts of the shutter aperture 1a on the sides thereof located in the travelling directions of a trailing blade group 4 which is moving as will be described later. The bent edge parts 1b and 1e protrude outward or toward the front of the shutter from the shutter aperture edge sides located perpendicularly to the moving directions of the trailing blade group 4. A cover plate 2 is opposed to the shutter base plate 1 at an unvarying distance away from the base plate 1. The cover plate 2 is also provided with a shutter aperture 2a which is in a position corresponding to the above stated shutter aperture 1a. A leading blade group 3 and the above stated trailing blade group 4 are interposed in between the shutter base plate 1 and the cover plate 2 across a separating plate 5. The separating plate 5 is also provided with an aperture 5a which is located in a position corresponding to the aperture 1a. Blade arms 6 and 7 (blade arms for the leading blade group 3 are not shown) are arranged in combination with a known link device to open and close (blocking and unblocking light) the shutter apertures 1a and 2a. Blade dowels 8 are arranged to turnably connect the shutter blades to the blade arms. The trailing blade group 4 is provided with a slit forming part 4a. The leading and trailing blade groups 3 and 4 are arranged similarly to each other as blade units. A leading blade driving lever 9 is coupled to the blade arms by a pin 9a and is arranged to drive the leading blade group 3 to open and close by pivoting on a shaft P. A trailing blade driving lever 10 is coupled to the blade arms by a pin 10a and is arranged to drive the trailing blade group 4 to open and close by pivoting on a shaft Q. A leading blade driving spring 11 and a trailing blade driving spring 12 are respectively arranged to cause their arms 11a and 12a to abut on a pin 9b of the leading blade driving lever 9 and a pin 10b of the trailing blade driving lever 10. The spring forces of the springs 11 and 12 are exerted to turn the driving levers 9 and 10 clockwise on the shafts P and Q. A ratchet 13 is provided for adjusting the leading blade driving spring force and another ratchet 14 for adjusting the trailing blade driving spring force. The stationary arms (not shown) of the driving springs are carried by these ratchets. The spring forces are adjusted by turning these ratchets round in such a way as to obtain a given shutter curtain speed. The positions of these ratchets are arranged to be fixed by means of pawls which are not shown. The leading blade driving lever 9 and the trailing blade driving lever 10 are arranged to be turned round counterclockwise on their shafts P and Q by means of a charging device which is not shown. Each of these blade driving levers 9 and 10 is thus shifted from a travel completed position shown in FIG. 1 to a travel preparing position and is locked in that position by means of a clamping device which is not shown. A shutter control device 15 comprises magnets (not shown), etc. which are arranged to operate the above stated clamping devices. The device 15 thus controls the travel timing of the shutter blades to define an exposure time thereby.

The first embodiment which is arranged in this manner operated as follows: When an action start signal is applied to a leading blade controlling magnet among shutter time controlling magnets under a condition in which the shutter blades are shifted from the travel completed state of FIG. 1 to the travel preparing state by the charging device (not shown), the magnet renders a leading blade clamping lever which is not shown operative. This unlocks the leading blade driving lever 9. The leading blade driving lever 9 is then caused by the urging force of the leading blade driving spring 11 to open the leading blade group 3 by turning round clockwise on the shaft P. Then, after the lapse of a given period of time, when an action start signal is applied to a trailing blade control magnet which is not shown, the trailing blade group 4 begins its closing action through a process similar to the process for the leading blade group 3. Then an exposure comes to an end with the shutter blades having completed their travel. Whereas, in case that the shutter is operated in a state of having an external force thereon due to the leader part of the film or air pressure exerted on the shutter blades from behind them, the shutter blades which have their rigidity lowered by reduction in thickness is greatly warped by the external force during the process of the shutter operation. However, as shown in FIG. 2, the relation of the warping direction of the leading blade group 3 to the overlapped arrangement of the blades saves a blade 3d which is located most leeward among the blades from completely falling into the inside of the aperture part 5a of the separating plate 5. It enables the leading blades to uphold and guide one another from the one located leeward. Therefore, the leading blade group 3 can be operated without any problem even under the above stated condition. In the case of the trailing blade group 4, however, a blade which is located most leeward and has the slit forming part 4a among the trailing blades as shown in FIG. 3 comes to completely fall into the inside of the shutter aperture 1a of the shutter base plate 1. Then, the shutter is operated with the middle part 4s of the slit forming part 4a and the end part 4b of the intermediate blade in a state of somewhat protruding from the front surface of the shutter base plate 1. If the shutter is arranged like the conventional shutter, the edge of the shutter aperture of the shutter base plate 1 would damage the shutter by colliding with the middle part 4s when the shutter blades are traveling and with the end part 4b when the shutter blades are being set. Whereas, this embodiment is arranged to solve this problem as follows. Since the embodiment acts in the same manner both when the shutter blades are traveling and when the shutter blades are being set in respect to the effect attainable according to the invention, the following description covers only the action to be performed when the blades are travelling. The middle part 4s is in a state of protruding forward somewhat further than the front surface of the shutter base plate 1 in this instance as mentioned above. This state is as shown in FIGS. 4 and 5. FIG. 5 is an enlarged section taken across the middle of the shutter aperture part showing the embodiment as in the same state as shown in FIG. 4. Then, the slit forming part 4a of the trailing blade group 4 eventually comes to pass near the end part 1c of the bent edge part 1b. The end part 1c which virtually serves as one side of the shutter aperture 1a in this case is located further forward from the front surface of the shutter base plate 1 than the middle part 4s of the slit forming part 4a. This arrangement thus prevents the slit forming part 4a from colliding with the end part 1c serving as one side of the shutter aperture 1a. Referring to FIG. 6 and FIG. 7 which is an enlarged sectional view taken across the middle of the shutter aperture part showing the shutter as in the same state as shown in FIG. 6, with the collision thus prevented, the shutter blades are allowed to smoothly complete their travel being guided by the smooth slanting face 1d of the bent edge part 1b provided on the shutter base plate 1.

Figures 9, 10:
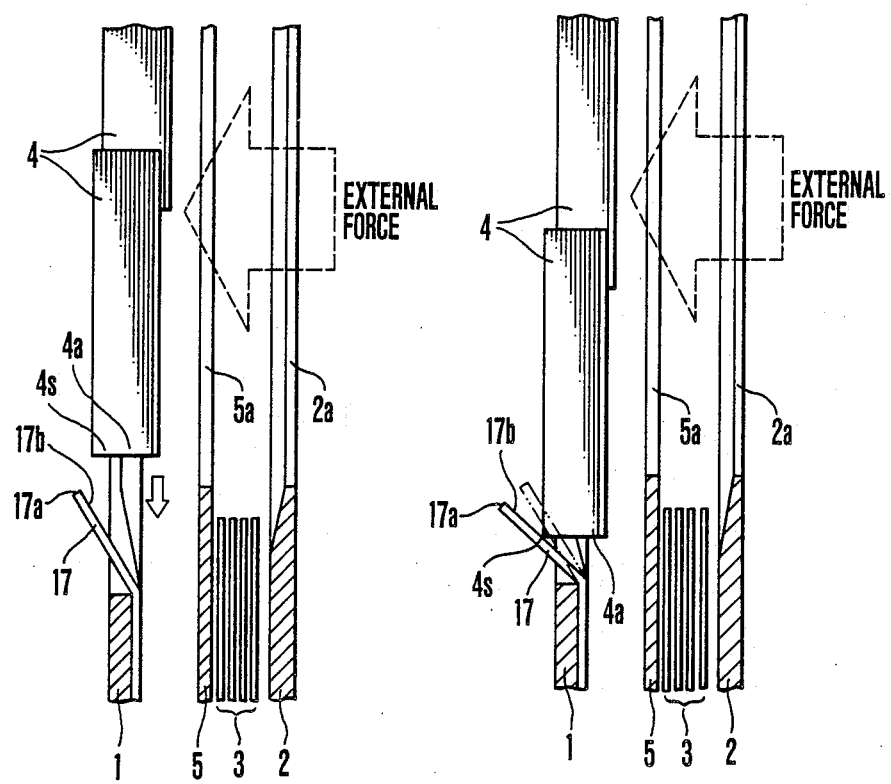
FIG. 9 is an enlarged sectional view taken in the middle of a shutter aperture part of the second embodiment showing the shutter blades as in a state of being warped by an external force exerted from behind while they are traveling.
FIG. 10 is an enlarged partial sectional view taken across the middle of the shutter aperture part of the second embodiment showing the shutter blades as in a state of having completed their travel while being warped by an external force which is exerted from behind.
Figure 11:
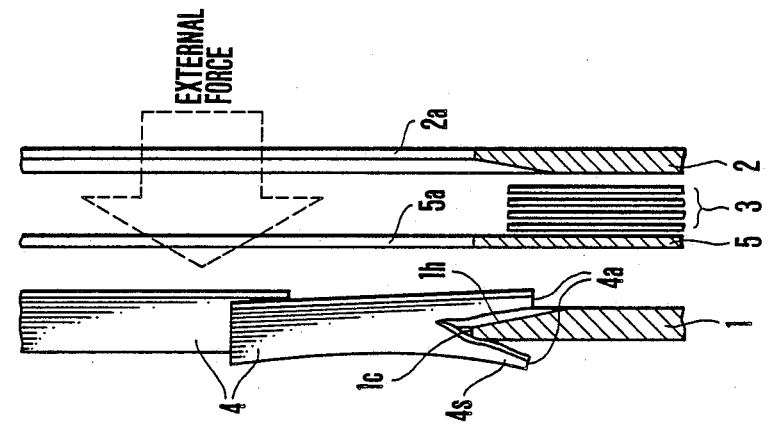
FIG. 11 is an enlarged partial sectional view taken across the middle of the shutter aperture part of the conventional shutter showing it as in a state of having completed its normal operation.
Figure 12:
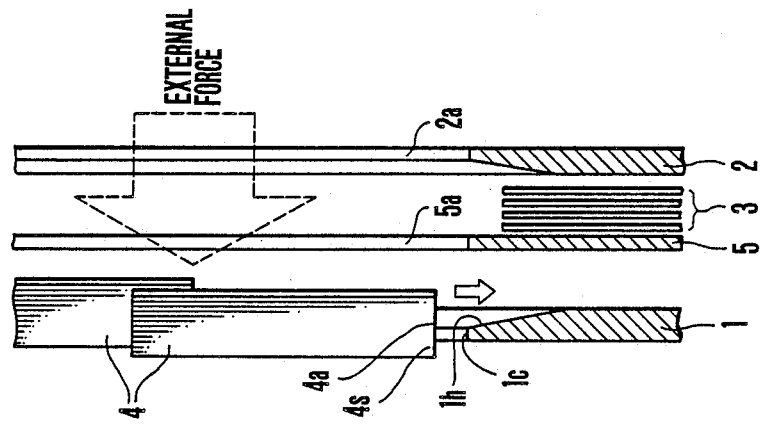
FIGS. 12 to 15 are illustrations showing shutter blades as in a state of being damaged by collision occurred while they are warped by an external force exerted on them from behind.
Figure 13:
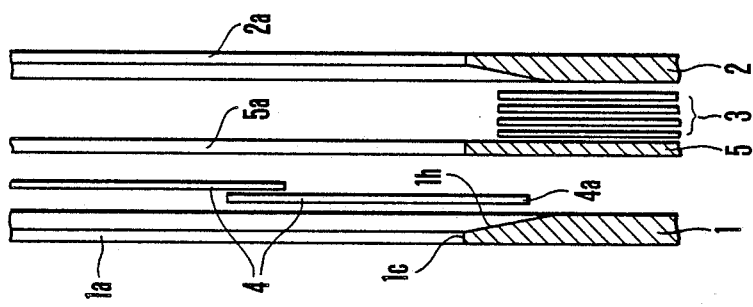
Figure 15:
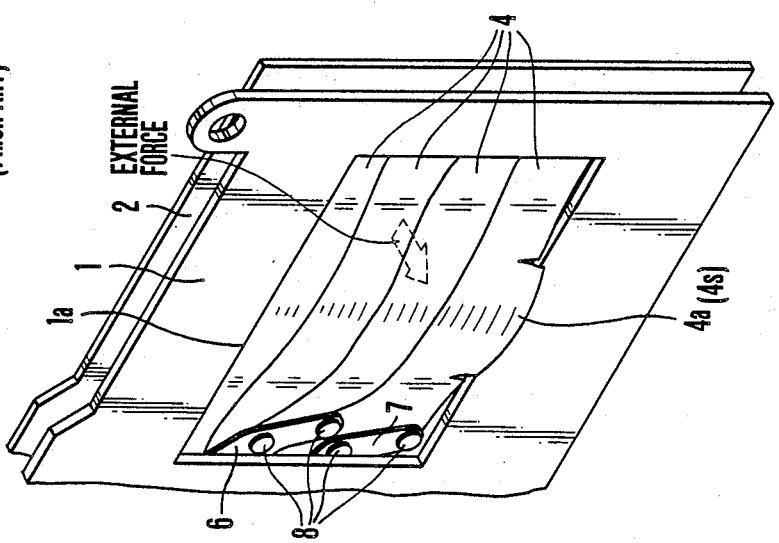
Figure 14:
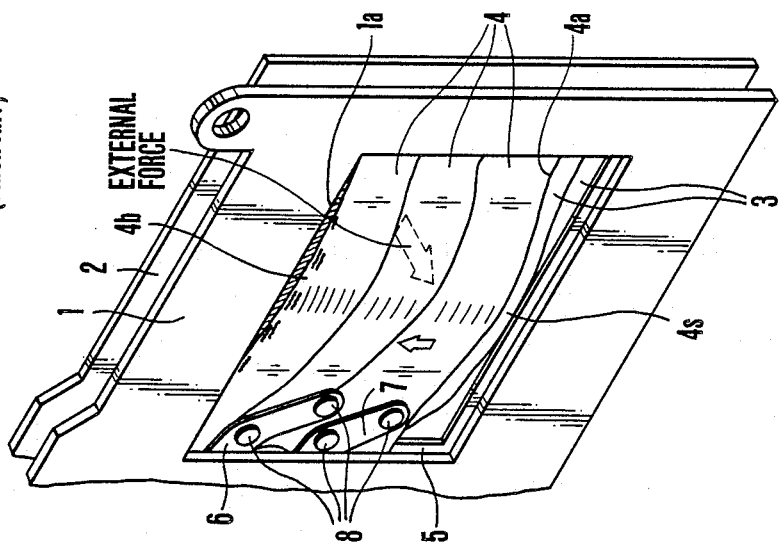

A second embodiment of the invention is arranged as shown in FIGS. 8 to 10, wherein FIG. 8 is an oblique view showing in outline the whole shutter of the second embodiment. FIG. 9 is an enlarged partial sectional view taken across the middle of a shutter aperture part showing the shutter blades as in a state of travelling while being warped by an external force exerted from behind. FIG. 10 is another enlarged partial section across the middle of the shutter aperture part showing the shutter blades as in a state of having completed their travel while being warped by an external force which is applied from behind.

In these drawings, the parts performing the same actions as those of the first embodiment described in the foregoing are denoted by the same reference numerals. Slanting guide pieces 16 and 17 which represent an essential feature of the second embodiment are provided for shutter blades and arranged along the upper and lower side ends of the shutter aperture 1a. Each of the slanting guide pieces 16 and 17 is made of a flexible, highly resilient material such as a leaf spring material or a polyester sheet material. The guide pieces 16 and 17 have end parts 16a and 17a which are located in front of the shutter (on the side of a mirror box of the camera) in such a position as to have no adverse effect on a film exposing action and on the action of the movable mirror system. The guide pieces 16 and 17 also have smooth slanting faces 16b and 17b and are secured to the shutter base plate 1 on the side of the blade travelling space by means of an adhesive or the like. With the exception of this, the rest of the arrangement of the second embodiment is exactly the same as in the first embodiment.

The second embodiment which is arranged in this manner operates as follows: Since the essential action of the embodiment is performed in the same manner both during the travel of the shutter blades and during the blade setting process, the following description covers only the operation to be performed while the shutter blades are travelling. Since the second embodiment differs from the first embodiment in the state obtained immediately before the end of the travel of the trailing shutter blades, this part will solely be described here. Like in the case of the first embodiment, the shutter blades are assumed to be greatly warped by an external force exerted from behind. The trailing blade group 4 is assumed to travel then in a state of having the middle part 4s of its slit forming part 4a protruded forward slightly further than the front surface of the shutter base plate 1. This state is as shown in FIG. 9. The slit forming part 4a of the trailing blade group 4 then comes to pass near the shutter aperture end part 17a. In this instance, the shutter aperture end part 17a is located further forward away from the front surface of the shutter base plate 1 than the middle part 4s of the slit forming part 4a of the trailing blade group 4. Therefore, the slit forming part 4a never comes to collide with the shutter aperture end part 17a and smoothly complete its travel along the smooth slanting face 17b of the slanting guide piece 17. In this instance, as shown by a two-dot-chain line in FIG. 10, the slanting guide piece 17 suitably flexes away from its original position in accordance with the movement of the slit forming part 4a in such a way as to absorb the impact of contact with the shutter blade.

In the first and second embodiments described, protruding parts are formed along the two edges of the shutter aperture 1a located in the moving directions of the trailing shutter blade group 4. These protruding parts are arranged as the bent edge parts 1b and 1e or as the slanting guide pieces 16 and 17. The provision of these two protrudent parts, instead of one protrudent part, further enhances the safety of the shutter. However, the travel of the trailing blade group 4 from the travel preparing position (see FIG. 2) to the travel completed position (see FIG. 1) is a sole high speed motion that otherwise has the possibility of damaging the shutter blade. In actuality, therefore, an adequate result is attainable by singly providing the bent end part 1b or the slanting guide piece 17 solely in the above stated travelling direction of the shutter blades.

Further, in each of the embodiments described, the bent edge parts 1b and 1e or the end parts 16a and 17a of the slanting guide pieces 16 and 17 of the shutter aperture 1a are arranged to give about the same opening area as that of other shutter apertures 2a and 5a. This arrangement, therefore, precludes the possibility of causing any undesired eclipse of light coming from an object to be photographed.

In the first and second embodiments described, the slit forming part 4a of the trailing blade group 4 is arranged to be located further toward the travelling direction than the basic point (cardinal point) of the capability of the shutter will be not much impaired.

Further, in the first and second embodiments, the bent edge parts 1b handle or the slanting guide pieces 16 and 17 of the shutter aperture 1a are formed to protrude from edges which are located on the sides extending perpendicularly to the moving directions of the trailing blade group 4 (laterally extending without any reference numerals as viewed on FIG. 4). In other words, slanting faces 1d and 1g or 16b and 17b are obtained by protruding only the edges located in the moving directions of the trailing blade group 4. Therefore, each blade of the trailing blade group 4 has its longitudinal side spaces always restricted by the above stated perpendicular side edges of the shutter aperture. The travelling space of the trailing blade group 4 available in the direction of an optical axis never widens. The travel of the trailing blade group 4 and its position after completion of the travel are thus adequately restricted to preclude any problem in terms of the light shielding (light leak preventing) capability of the shutter.

Further, in the first and second embodiments, the bent edge parts 1b and 1e or the slanting guide pieces 16 and 17 are provided as the protruding parts of the shutter aperture 1a of the shutter base plate 1. In cases where the relative positions of the shutter base plate 1 and the cover plate 2 are conversely arranged or where an external force is expected to be exerted from the lens side of the camera, protruding parts which are similar to the bent edge parts 1b and 1e are of course formed at the shutter aperture 2a of the cover plate 2.

As described in the foregoing, in the case of the first or second embodiment, this invention is applied to a camera shutter having a leading blade group and a trailing blade group, each consisting of divided blades which are movably arranged. The invention provides the shutter with a structural arrangement whereby the parts protruding from the edges of a shutter aperture provided in the shutter base plate or in the cover plate effectively prevents the blades from being damaged by colliding against an edge part of the shutter aperture even when an external force is applied to the shutter blades while the shutter is operating.

Figure 16:
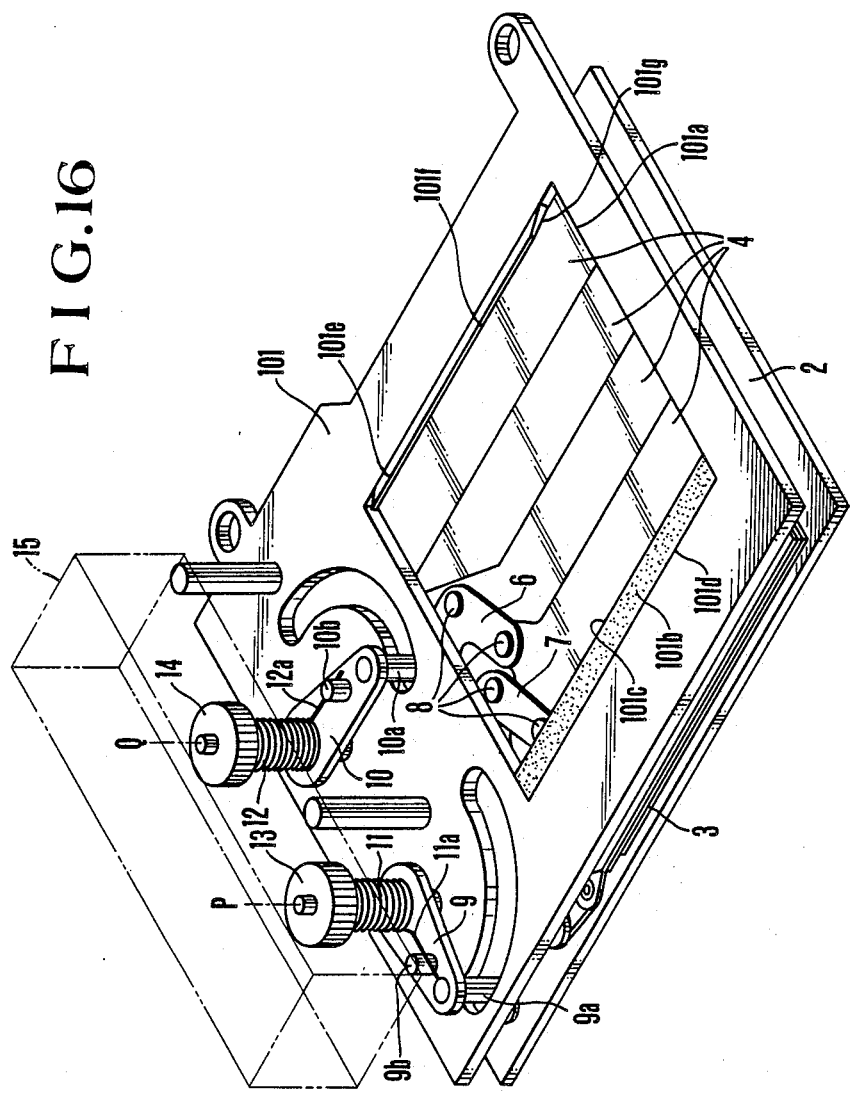
FIG. 16 is an oblique view showing in outline a whole shutter which is arranged according to this invention as a third embodiment thereof.
Figure 17:
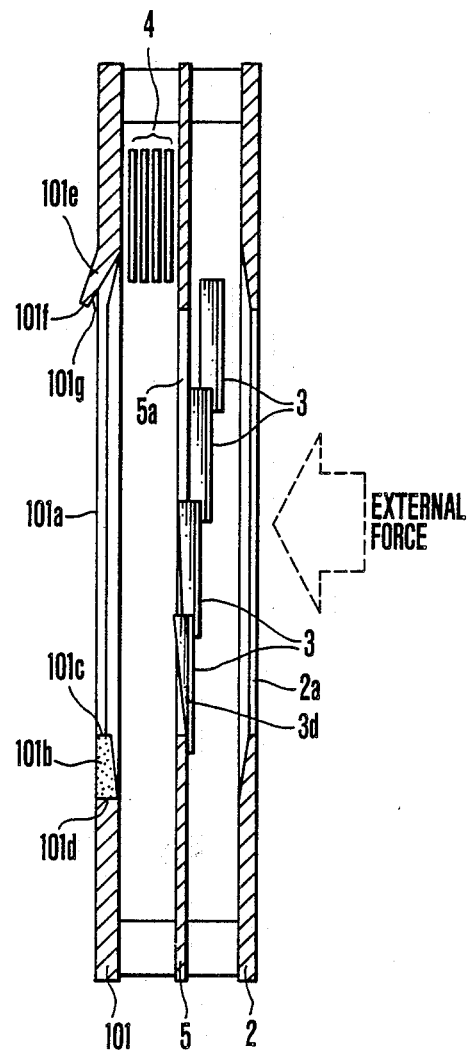
FIG. 17 is a longitudinal sectional view taken across the middle of the shutter aperture part of the third embodiment showing shutter blades as in a travel preparing state under an external force which is exerted from behind.
Figure 18:
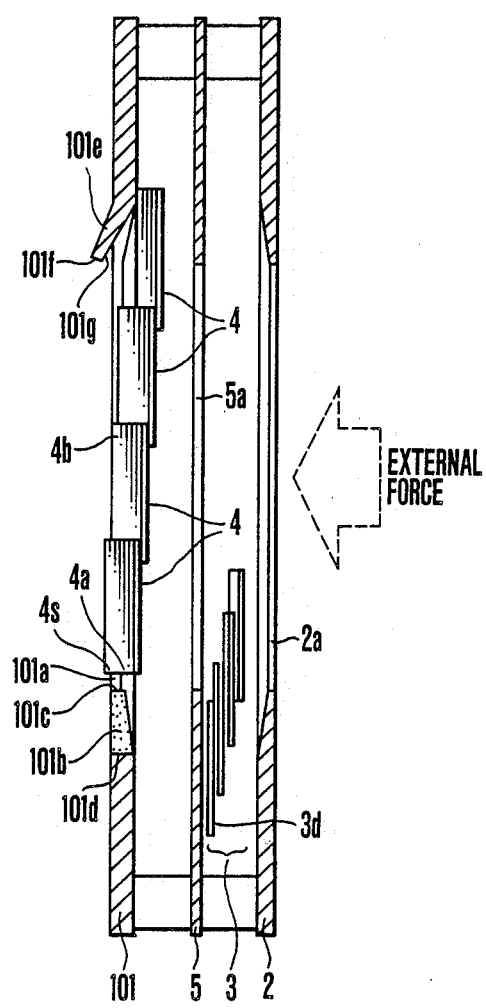
FIG. 18 is a longitudinal sectional view taken across the middle of the shutter aperture part of the third embodiment showing the shutter blades as in the process of being set under an external force exerted from behind.
Figure 19:
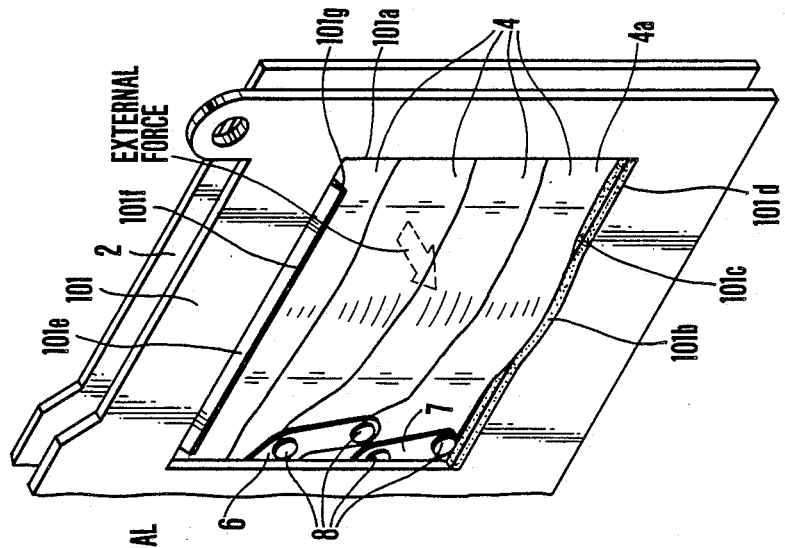
FIG. 19 is a partial oblique view showing the shutter blades of the third embodiment as in a traveling state under an external force exerted from behind.
Figure 20:
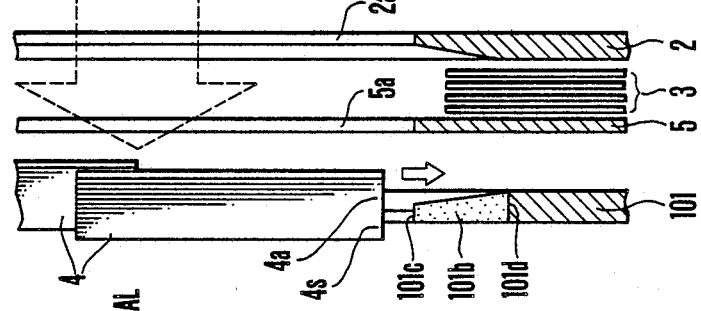
FIG. 20 is an enlarged partial sectional view taken across the shutter aperture part of the third embodiment showing the shutter blades as in the same state as in FIG. 19.
Figure 21:
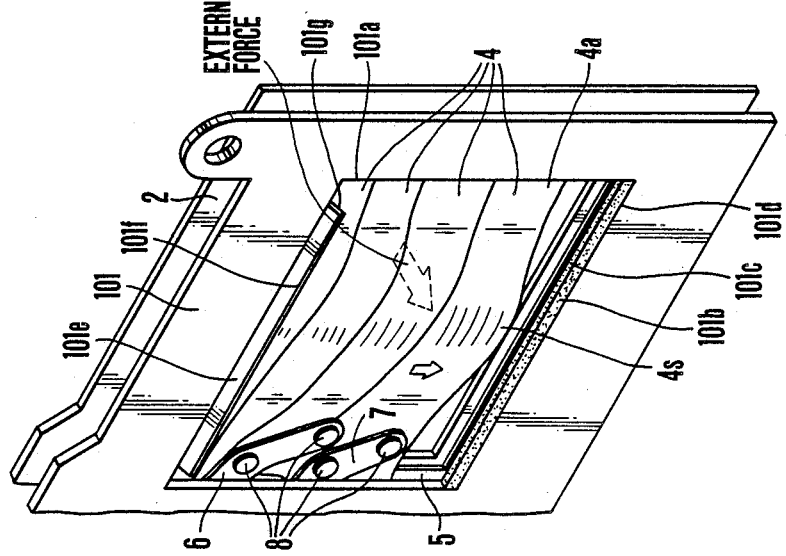
FIG. 21 is an oblique view showing the shutter blades of the third embodiment as in a state of having completed their travel while being warped by an external force exerted from behind.
Figures 22, 23:
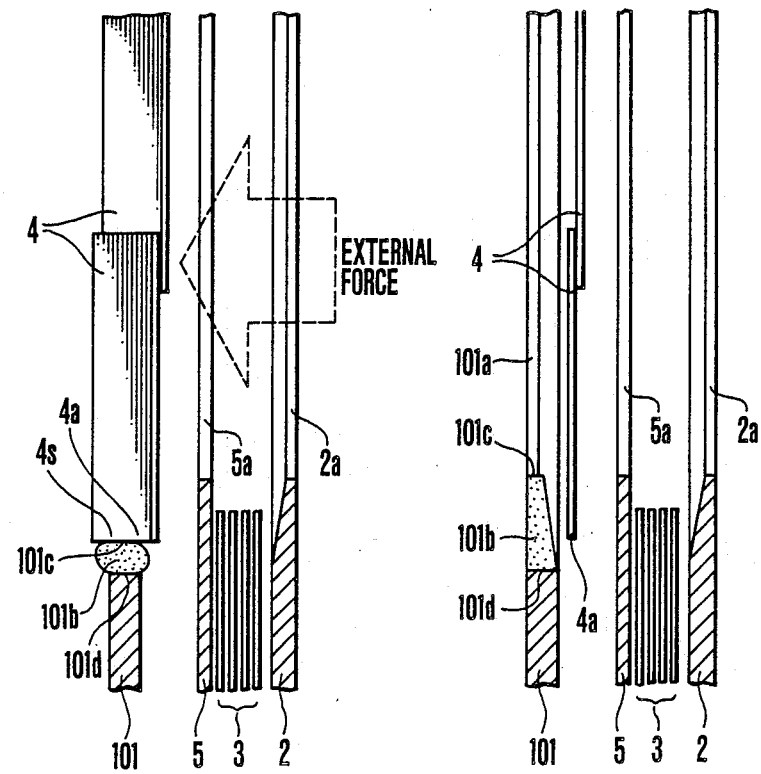
FIG. 22 is an enlarged partial sectional view taken across the middle of the shutter aperture part of the third embodiment showing it as in the same state as in FIG. 21.
FIG. 23 shows the shutter blades of the third embodiment as in a state of having resumed their normal condition after completion of their travel.

A third embodiment of the invention is arranged as shown in FIGS. 16 to 23, wherein: FIG. 16 is an oblique view showing in outline a whole shutter. FIGS. 17 and 18 are longitudinal sections taken across the middle of a shutter aperture part showing shutter blades as under an external force exerted from behind while they are in a state of being prepared for travelling in the case of FIG. 17 and in the process of being set in the case of FIG. 18. FIG. 19 is a partial oblique view showing the blades as in a state of travelling while being warped by the external force exerted from behind. FIG. 20 is an enlarged partial section taken across the middle of the shutter aperture part showing the shutter as in the same state as the state shown in FIG. 19. FIG. 21 is a partial oblique view showing the shutter blades as in a state of having completed their travel under the external force exerted from behind. FIG. 22 is an enlarged partial section taken across the middle of the shutter aperture part showing the shutter as in the same state as the state shown in FIG. 21. FIG. 23 shows the shutter blades as in a state of having been relieved from the external force exerted from behind and resumed its normal condition after completion of their travel.

The following description of the third embodiment is limited to the difference thereof from the first embodiment: Referring to FIGS. 16 to 23, a shutter base plate 101 is provided with a shutter aperture 101a in about the middle part thereof. A shock absorbing elastic member 101b is provided along one side edge of the shutter aperture 101a located in the moving direction of shutter blades. The elastic member 101b is made of a highly flexible, resilient material such as a soft rubber material, Moltoprene or the like. An end part 101c of the member 101b forms one side of the shutter aperture while a bottom 101d of the member 101b is secured by means of an adhesive to one side face of the aperture. A bent edge part 101e is formed along an edge of the shutter aperture on a side opposite to the above stated elastic member 101b. The bent edge part 101e extends outward, or toward the front of the shutter (on the side of the lens and mirror box of the camera) to have an end part 101f thereof in a position not to affect a film exposure to light and the operation of the moving mirror system of the camera. The bent edge part 101e has a smooth slanting face 101g.

The third embodiment operates as follows: With the shutter shifted from the travel completed position of FIG. 16 and set in a travel preparing position by means of a charging device which is not shown, when an operation start signal is applied to a leading blade control magnet among magnets provided for shutter time control, a leading blade clamp lever which is not shown is operated by the magnet to unlock a leading blade driving lever 9. This allows the urging force of a leading blade driving spring 11 to turn the lever 9 round on a shaft P to open the leading blade group 3.

Then, when an operation start signal is applied to a trailing blade control magnet (not shown) after the lapse of a given period of time, the trailing blade group 4 begins to perform a closing action through the same process as the leading blade group 3. This brings an exposure to an end. The travel of the shutter blades comes to an end. However, in case that the shutter is operated while an external force is applied to the shutter blades from behind the shutter by the leader part of film or some air pressure or the like, the shutter blades which have a low degree of rigidity due to their reduced thickness come to be greatly warped by the external force before the end of the operation. Then, as shown in FIG. 17, the relation of the warping direction of the leading blade group to the overlapped state of the blades prevents a blade $3d$ which is located most leeward from completely falling into the aperture part $5a$ of a separating plate 5. Among the leading blade group 3, blades uphold one another with each leeward blade carrying another blade located right above while they are being guided. Therefore, the leading blade group 3 can be operated without difficulty. In the case of the trailing blade group 4, a blade which is located most leeward among them and has a slit forming part $4a$ comes to fall completely into the shutter aperture $101a$ as shown in FIG. 18. The middle part $4s$ of the slit forming part $4a$ and the end part $4b$ of a blade intermediately located among the group 4 protrude forward a little further than the front surface of the shutter base plate 101 while the shutter is in operation. Under such a condition, the conventional shutter has been damaged as the edge of the shutter aperture has the middle part $4s$ come to collide therewith if the shutter blades are travelling or has the end part $4b$ come to collide therewith if the shutter blades are being set. This problem is solved by this embodiment. FIG. 19 shows the shutter blades as in a state of travelling with the middle part $4s$ caused to protrude a little further than the front surface of the shutter base plate 101 under the external force. FIG. 20 is an enlarged sectional view taken across the middle of the shutter aperture part showing the shutter as in the same state as the state shown in FIG. 19. Referring to FIGS. 19 and 20, when the slit forming part $4a$ of the trailing blade group 4 reaches the position of the end part $101c$, the shock absorbing elastic member $101b$ which is made of a material sufficiently softer than the material of the blade is pushed and begins to be deformed. The elastic member $101b$ is further deformed to absorb the impact of the blade until it becomes as shown in FIGS. 21 and 22. This allows the trailing blade group 4 to complete its travel without damaging the slit forming part $4a$. When the external force which is exerted from behind disappears, the trailing blade group 4 settles in its normal position as shown in FIG. 23. This allows the elastic member $101b$ to come back to its initial state.

Figure 24:
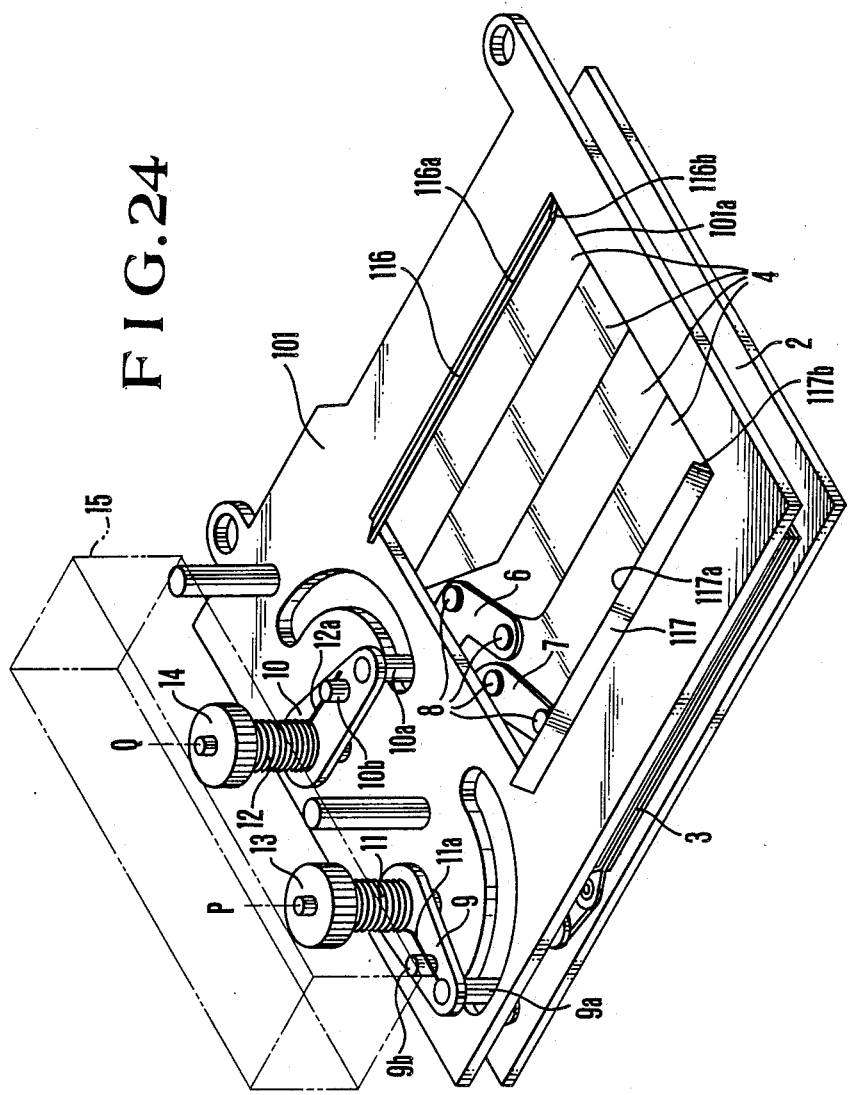
FIG. 24 is an oblique view showing in outline a whole shutter which is arranged as a fourth embodiment of the invention.

A fourth embodiment of the invention is as shown in FIGS. 24 to 26, wherein: FIG. 24 is an oblique view showing in outline a whole shutter. FIG. 25 is an enlarged partial section taken across the middle of a shutter aperture part showing shutter blades as in a traveling state while being warped by an external force exerted from behind. FIG. 26 is a like sectional view showing the shutter blades as in a state of having completed their travel while being warped by an external force.

In FIGS. 24 to 26, the parts acting in the same manner as those of the third embodiment are indicated by the same reference numerals. The shutter is provided with slanting guide pieces 116 and 117, which represent an essential feature of the fourth embodiment. The slanting guide pieces 116 and 117 are provided at the upper and lower sides of a shutter aperture $101a$ for guiding shutter blades. These pieces 116 and 117 are made of a flexible, highly resilient material such as a leaf spring material, a polyester sheet material or the like. They are allowed to extend toward the front of the shutter (on the side of the mirror box of the camera which is not shown) to have their end parts $116a$ and $117a$ located in positions not to affect an exposure of film to light and the operation of the moving mirror system of the camera. They are provided with smooth slanting faces $116b$ and $117b$ and are secured to a shutter base plate 101 by means of an adhesive or the like. The rest of the arrangement of the shutter is the same as the third embodiment.

The fourth embodiment which is arranged in this manner operates as follows: The advantageous effect of the embodiment is likewise attained both in cases where the shutter blades are travelling and where they are being set. Therefore, the following description is limited to the operation of the embodiment performed when the shutter blades are travelling. Further, since the fourth embodiment differs from the third embodiment only in the state obtained immediately before the end of the travel of the trailing blade group 4, that part of the operation alone will be described. Like in the case of the third embodiment, an external force is assumed to be exerted on the shutter blades from behind the shutter. Under this condition, the trailing blade group 4 travels in a state of being greatly warped to have the middle part $4s$ of the slit forming part $4a$ thereof protruding a little further than the front surface of the shutter base plate 101. This state is as shown in FIG. 25. The slit forming part $4a$ of the trailing blade group 4 comes to pass near the position of the end part $117a$ of the slanting guide piece 117. In this instance, the end part $117a$ is arranged to be further forward away from the front surface of the shutter base plate 101 than the middle part $4s$ of the slit forming part $4a$. This enables the trailing blade slit forming part $4a$ to smoothly move along the smooth slanting face $117b$ of the slanting guide piece 117 and comes to complete its travel without colliding with the end part $117a$ of the slanting guide piece 117. At that time, as shown in FIG. 26, the slanting guide piece 117 suitably flexes according to the movement of the slit forming part $4a$ to absorb the impact of contact with the shutter blade. When the external force applied from behind the shutter disappears, the trailing blade group 4 settles in its normal position. As a result, the slanting guide piece 117 also comes to resume its initial position as shown in FIG. 25 or as shown by a two-dot-chain line in FIG. 26.

In the third and fourth embodiments described, the end part $101c$ of the elastic member $101b$ or the end parts $116a$ and $117a$ of the slanting guide pieces 116 and 117 of the shutter aperture $101a$ are arranged to let the aperture $101a$ have about the same area as other shutter apertures $2a$ and $5a$ which are provided in the cover plate 2 and the separating plate 5. This arrangement, therefore, prevents the object's light from being unduly eclipsed by these aperture defining parts.

Further, the third and fourth embodiments are arranged to provide the shutter aperture 101a of the shutter base plate 101 with the shock absorbing elastic member 101b or the slanting guide pieces 116 and 117. However, in cases where the positional relation between the shutter base plate 101 and the cover plate 2 is reversed or where the external force is expected to be exerted from the lens side, instead of from behind the shutter, the shutter aperture 2a of the cover plate 2 is of course provided with a shock absorbing member that is similar to the elastic member 101b or the like.

As described in the foregoing, in the case of the third and fourth embodiments, the camera shutter having leading and trailing blade groups, each consisting of divided blades which are arranged to be movable is capable of preventing the shutter blades from being damaged by colliding with an edge part of the shutter aperture even when an external force is applied to the shutter blade while the shutter is operating. This advantageous feature of these embodiments is attained by virtue of the shock absorbing elastic member which is provided at the edge part of the shutter aperture formed in the shutter base plate or in the cover plate of the shutter.

What is claimed is:

1. A shutter for a camera having leading and trailing blade groups movably interposed between a plurality of plate-shaped members each of which having a shutter aperture, each of said blade groups including a plurality of divided blades, comprising:
    (a) a protruding part formed along an edge part of said shutter aperture on one side thereof located in the moving direction of said blade groups, said protruding part being arranged:
    (a-1) to protrude from said edge part of said shutter aperture at an angle directed away from a plane defined by said blade groups; and
    (a-2) to have a slanting face.

2. A shutter according to claim 1, wherein said protruding part is provided on one of said plate-shaped members disposed on the side of a photo taking lens.

3. A shutter according to claim 1, wherein said protruding part is formed along two side edge parts of said aperture located in the moving directions of said shutter blade groups.

4. A shutter according to claim 1, wherein said protruding part is formed integrally with said plate-shaped member.

5. A shutter according to claim 1, wherein said protruding part is secured to said plate-shaped member as a discrete member.

6. A shutter according to claim 1, wherein said protruding part is arranged to be elastically deformable when said blade group collides therewith.

7. A shutter according to claim 6, wherein said protruding part is made from a leaf spring material.

8. A shutter for a camera having leading and trailing blade groups movably interposed between a plurality of plate-shaped members each of which having a shutter aperture, each of said blade groups including a plurality of divided blades, comprising:
    an elastic member disposed along an edge part of said shutter aperture on one side thereof located in the moving direction of said blade groups, said elastic member being arranged to absorb an impact when said blade group comes into contact therewith wherein said elastic member is formed along two side edge parts of said shutter aperture located in the moving directions of said blade groups.

9. A shutter for a camera having leading and trailing blade groups movably interposed between a plurality of plate-shaped members each of which having a shutter aperture, each of said blade groups including a plurality of divided blades, comprising:
    an elastic member disposed along an edge part of said shutter aperture on one side thereof located in the moving direction of said blade groups, said least member being arranged to absorb an impact when said blade group comes into contact therewith wherein said elastic member is made of a highly flexible and resilient material including a soft rubber and a Moltoprene.

10. A shutter for a camera having a leading and trailing blade groups movably interposed between a plurality of plate-shaped members each of which having a shutter aperture, each of said blade groups including a plurality of divided blades, comprising:
    (a) a protruding part formed along one of two edge parts of said shutter aperture located in the moving direction of said blade groups, said protruding part being arranged:
    (a-1) to protrude from said one of said two edge parts of said shutter aperture at an angle directed from a plane defined by said blade groups; and
    (a-2) to have a slanting face; and
    (b) an elastic member disposed along another of said two edge parts of said shutter aperture located in the moving direction of said blade groups.

* * * * *

UNITED STATES PATENT AND TRADEMARK OFFICE
CERTIFICATE OF CORRECTION

PATENT NO. : 4,963,908

DATED : October 16, 1990

INVENTOR(S) : Toyoda, et al.

It is certified that error appears in the above-identified patent and that said Letters Patent is hereby corrected as shown below:

COLUMN 2:

Line 28, "vie" should read --view--.

COLUMN 5:

Line 60, "follows." should read --follows:--.

COLUMN 6:

Line 21, "wherein" should read --wherein:--.

COLUMN 7:

Line 43, "the capa-" should read --the bent edge part 1b or the slanting guide piece 17 of the shutter aperture 1a. Therefore, the light shielding capa- --.

Line 46, "handle" should read --and le--.

UNITED STATES PATENT AND TRADEMARK OFFICE
CERTIFICATE OF CORRECTION

PATENT NO. : 4,963,908

DATED : October 16, 1990

INVENTOR(S) : Toyoda, et el.

It is certified that error appears in the above-identified patent and that said Letters Patent is hereby corrected as shown below:

COLUMN 12:

Line 29, "least" should read --elastic--.

Signed and Sealed this

Twenty-first Day of April, 1992

Attest:

HARRY F. MANBECK, JR.

*Attesting Officer*  *Commissioner of Patents and Trademarks*